(12) United States Patent
Kuo

(10) Patent No.: US 12,020,169 B2
(45) Date of Patent: Jun. 25, 2024

(54) ARTIFICIAL INTELLIGENCE (AI) SERVICE-BASED HANDLING OF EXCEPTIONS IN CONSUMER ELECTRONIC DEVICES

(71) Applicant: SONY CORPORATION, Tokyo (JP)

(72) Inventor: Jenke Wu Kuo, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 1184 days.

(21) Appl. No.: 16/414,965

(22) Filed: May 17, 2019

(65) Prior Publication Data

US 2020/0364581 A1 Nov. 19, 2020

(51) Int. Cl.
*G06N 3/08* (2023.01)
*G06N 3/10* (2006.01)

(52) U.S. Cl.
CPC .............. *G06N 3/10* (2013.01); *G06N 3/08* (2013.01)

(58) Field of Classification Search
CPC ................................... G06N 3/08; G06N 3/10
See application file for complete search history.

(56) References Cited

U.S. PATENT DOCUMENTS

| | | | |
|---|---|---|---|
| 8,161,330 B1 | 4/2012 | Vannatter et al. | |
| 9,866,697 B2 | 1/2018 | Stepanian | |
| 10,278,074 B1* | 4/2019 | Shen | H04W 12/128 |
| 2019/0102244 A1* | 4/2019 | Tarlano | G06F 11/0787 |
| 2019/0277913 A1* | 9/2019 | Honda | G01R 31/2894 |
| 2020/0147791 A1* | 5/2020 | Safary | G06N 20/00 |

FOREIGN PATENT DOCUMENTS

| | | |
|---|---|---|
| JP | 6223236 B2 | 11/2017 |
| KR | 101249902 B1 | 4/2013 |

OTHER PUBLICATIONS

"All In on AI, Part 1: HomeCare Wizard, Enabling Smart Appliances to Diagnose Themselves", Samsung Newsroom, Jan. 26, 2018.

* cited by examiner

*Primary Examiner* — Marshall L Werner
(74) *Attorney, Agent, or Firm* — CHIP LAW GROUP

(57) ABSTRACT

A server for artificial intelligence (AI) service-based handling of exceptions in consumer electronic (CE) devices is provided. The server stores a neural network model that provides an AI service to handle exceptions in a plurality of CE devices. The server detects a new exception in an in-device system function of an in-device system of a first CE device and determines a cause of trigger of the new exception in the in-device system function of the in-device system based on the AI service and a plurality of different parameters of the first CE device. The server generates a first instruction to configure the in-device system specific to the new exception based on the AI service and the cause of trigger of the new exception. The server controls the in-device system in accordance with the first instruction based on the AI service such that the in-device system function is restored.

14 Claims, 6 Drawing Sheets

ARTIFICIAL INTELLIGENCE (AI) SERVICE-BASED HANDLING OF EXCEPTIONS IN CONSUMER ELECTRONIC DEVICES

CROSS-REFERENCE TO RELATED APPLICATIONS/INCORPORATION BY REFERENCE

None.

FIELD

Various embodiments of the disclosure relate to artificial intelligence (AI). More specifically, various embodiments of the disclosure relate to an apparatus and a method for AI service-based handling of exceptions in consumer electronic devices.

BACKGROUND

Advancements in consumer electronic (CE) devices have pushed for adoption of exception handling for various hardware/software exceptions. Conventionally, CE devices use exception handling routines to resolve exceptions which are known to commonly occur on CE devices. Also, these known exceptions are issued/detected by these exception handling routines and relate to common errors, crashes, or malfunctions associated with CE devices. However, there are instances where CE devices encounter certain issues, such as errors, crashes, or malfunctions due to exceptions which may have not been handled previously by these CE devices. In many instances, users have to rely on a service center to identify and resolve these encountered issues, which may be time consuming, inconvenient, and unacceptable for the user.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An apparatus and a method for artificial intelligence (AI) service-based handling of exceptions in consumer electronic devices, are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed apparatus and method for artificial intelligence (AI) service-based handling of exceptions in consumer electronic (CE) devices. Exemplary aspects of the disclosure provide a server that includes a memory and circuitry. The memory of the server may be configured to store a neural network model that provides an AI service to handle exceptions in a plurality of CE devices that are subscribed to the AI service of the neural network model. The server may be configured to detect a new exception in a CE device of the plurality of CE devices. The detected new exception may be an unhandled exception, a new exceptional error, or a malfunction in the in-device system function of a CE device. In certain cases, the new exception may be cause an error which may be unknown and may have occurred for the first time in the CE device.

The disclosed server may be further configured to determine a cause of trigger of the detected new exception in the CE device. The cause of trigger may be determined based on analysis and evaluation of a plurality of different parameters associated with the CE device, such as hardware information, version and configuration information, and information about the installed applications. The disclosed server may be further configured to generate an instruction for the resolution of the detected new exception based on the AI service and the determined cause of trigger. The disclosed server may be configured to restore the functions of the CE device based on the generated instructions. In contrast to conventional systems, the server may be configured to automatically detect a new exception or a new error in the CE device and generate the first instruction to resolve the detected new exception based on the AI service. The server may be configured to resolve the detected new exception which may be unknown by the server previously. Hence, the server may be configured to resolve the detected new error automatically, without any inputs from a user or a service center of the CE device. Furthermore, the resolution information of the new exception may be utilized in the training of the neural network model and may result in faster resolution of the similar errors in future.

Figure 1:
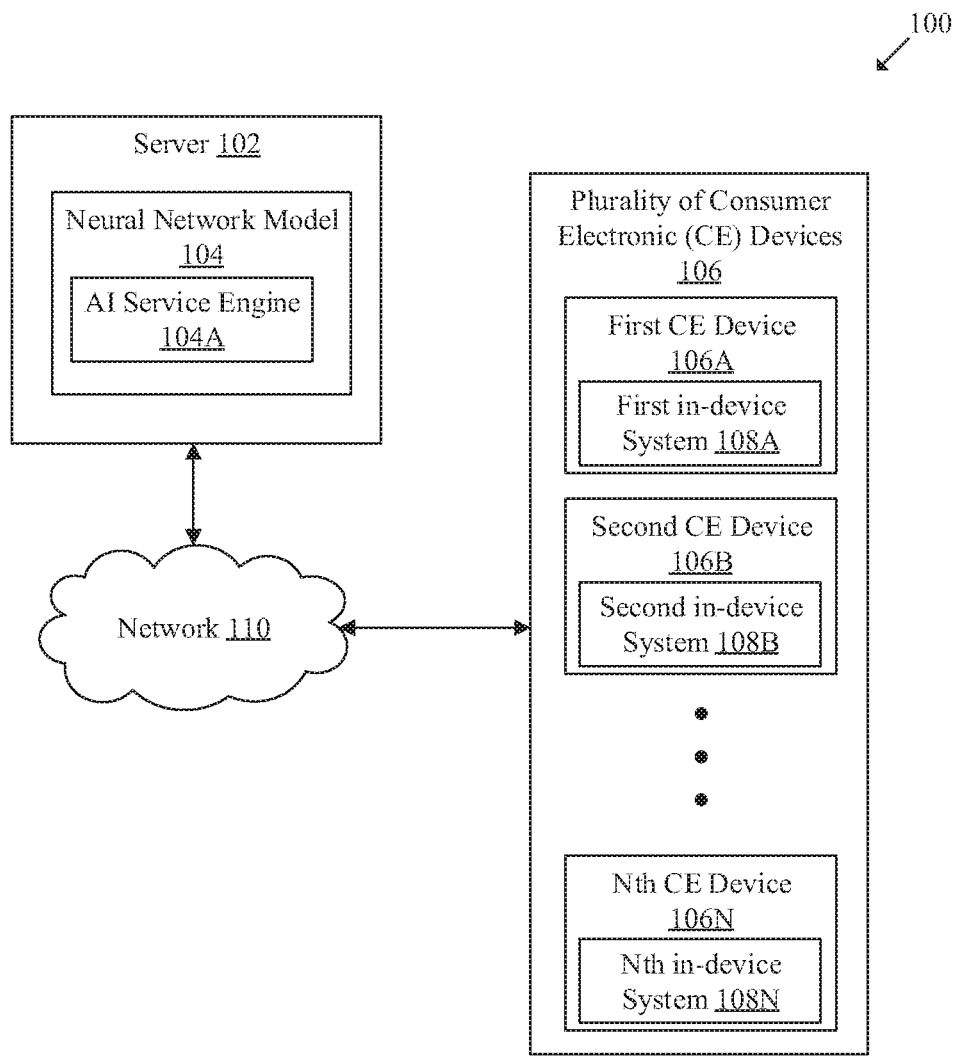
FIG. 1 is a block diagram that illustrates an exemplary network environment for artificial intelligence (AI) service-based handling of exceptions in consumer electronic (CE) devices, in accordance with an embodiment of the disclosure.

FIG. 1 is a block diagram that illustrates an exemplary network environment for artificial intelligence (AI) service-based handling of exceptions in consumer electronic (CE) devices, in accordance with an embodiment of the disclosure. With reference to FIG. 1, there is shown a network environment 100. The network environment 100 may include a server 102 and a plurality of CE devices 106. The server 102 may be coupled to at least one of the plurality of CE devices 106. The server 102 may include a neural network model 104. The neural network model 104 may include an AI service engine 104A. The plurality of CE devices 106 may include a first CE device 106A, a second CE device 106B . . . , and an N$^{th}$ CE device 106N. Each of the plurality of CE devices 106 may include an in-device system.

The server 102 may comprise suitable logic, circuitry, and interfaces that may be configured to store the neural network model 104. The stored neural network model 104 may include the AI service engine 104A that may be configured to provide an AI service to handle exceptions in the plurality of CE devices 106 that may be subscribed to the AI service of the neural network model 104. The server 102 may be further configured to detect a new exception in an in-device system function of an in-device system of a CE device (such as the first CE device 106A) based on the AI service. The in-device system may be a hardware system, a device set-up configuration system, an installed application, or a firmware on the CE device. Similarly, the in-device system function may correspond to an operation of the in-device system of the CE device. As an example, the in-device system function may correspond to a TV program recommendation function of an installed electronic program guide (EPG) application on a smart Television as the CE device.

The server 102 may be further configured to determine a cause of trigger of the new exception in the in-device system function, based on the AI service and a plurality of different parameters of the first CE device 106A. The server 102 may be further configured to generate an instruction to configure the in-device system of the first CE device 106A based on the AI service and the determined cause of trigger of the new exception. The server 102 may be further configured to resolve the detected new exception in the in-device system function and restore the in-device system function of the first CE device 106A based on the AI service. Examples of the server 102 may include, but are not limited to, an AI-based server, an application server, a cloud server, a mainframe server, a database server, a file server, a web server, or other types of servers.

The plurality of CE devices 106 may comprise suitable logic, circuitry, and interfaces that may be configured to communicate with the server 102. Each of the plurality of CE devices 106 may be an electronic device that may be utilized by a user or a consumer for a plurality of activities, such as entertainment, communication, or any other activity. Each of the plurality of CE devices 106 may include an in-device system. For example, the first CE device 106A may include a first in-device system 108A, the second CE device 106B may include a second in-device system 108B, and similarly, the N$^{th}$ CE device 106N may include an N$^{th}$ in-device system 108N. Each in-device system may be a hardware system, a device set-up configuration system, an installed application, or a firmware of the CE device. Examples of the plurality of CE devices 106 may include, but are not limited to, televisions, mobile phones, personal computers, a gaming console, media players, calculators, digital cameras, head-mounted devices, automotive electronic devices, electronic musical instruments or other consumer electronic devices.

The network 110 may include a communication medium through which the server 102 and the plurality of CE devices 106 may communicate with each other. Examples of the network 110 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the server 102 may be configured to store the neural network model 104. The neural network model 104 may be based on an artificial neural network (ANN) model or a deep neural network (DNN) model, such as a convolutional neural network (CNN) model or a recurrent neural network (RNN) model. The neural network model 104 may be a pre-trained model and may include the AI service engine 104A. The AI service engine 104A may be configured to provide an AI service to handle exceptions in the plurality of CE devices 106 subscribed to the AI service of the neural network model 104. The AI service may be a service provided by the neural network model 104 to render a solution for exceptional cases of errors or malfunction in the plurality of CE devices 106. The AI service engine 104A may provide the AI service based on learning of the neural network model 104. The neural network model 104 may be configured to learn based on certain inputs that may be given to the neural network model 104. One or more CE devices of the plurality of CE devices 106 may be subscribed to the AI service of the neural network model 104. In some cases, a CE device, such as the first CE device 106A, may be affected by an error or malfunction in the operation or hardware of the first CE device 106A.

The server 102 may be further configured to detect a new exception in an in-device system function of an in-device system, such as the first in-device system 108A of the first CE device 106A. The first in-device system 108A may be a hardware system, a device set-up configuration system, an installed application, or a firmware in the first CE device 106A. Similarly, the in-device system function may correspond to an operation of the first in-device system 108A of the first CE device 106A. For example the in-device system function may correspond to a music playback function of an installed music player application on the first CE device 106A.

The server 102 may be further configured to detect the new exception based on the AI service of the AI service engine 104A. The new exception may be an unhandled exception, a new exceptional error, or a malfunction in the in-device system function of the first in-device system 108A of the first CE device 106A. The new exception may not be known previously to the server 102 and may have occurred in the first in-device system 108A of the first CE device 106A for the first time. As an example, the new exception may be a software-type exception that may occur in the first CE device 106A. Examples of the detected new exception may include, but are not limited to, an error in the output of audio from an external speaker connected to the first CE device 106A, an error or distortion in display of the first CE device 106A, slowness in the in-device system function of the first CE device 106A, or any other exception or error in the working of the first CE device 106A.

The server 102 may be further configured to determine a cause of trigger of the new exception in the in-device system function of the first in-device system 108A of the first CE device 106A based on the AI service provided by the neural network model 104. The cause of trigger of the new exception in the in-device system function may be determined based on a plurality of different parameters of the first CE device 106A. The plurality of different parameters may include, but are not limited to, hardware information, a difference in current device settings with respect to factory settings, a version and configuration of the in-device system, an error log, or application data of one or more installed applications. The plurality of different parameters may further include, but are not limited to, a plurality of application services and processes running at the time of occurrence of the new exception, a power state, historical data of a plurality of exceptions, a network connection state, or an activity record at the first CE device 106A for a specified time period that elapsed from the time of the occurrence of the new exception.

The server 102 may be further configured to evaluate the first CE device 106A with respect to the plurality of different parameters, based on the AI service provided by the neural network model 104. The detected new exception may be due to or caused by an error or an undesirable change in any of the plurality of different parameters. Examples of the cause of trigger of the new exception may include, but are not limited to, a software bug in the first in-device system 108A, a software logic error, infinite loop or long-running uninterruptible computation, resource exhaustion, or some external errors, such as error in network connection. The determination of the cause of trigger is further described, for example, in FIG. 3.

The server 102 may be further configured to generate a first instruction to configure the first in-device system 108A specific to the new exception based on the determined cause of the trigger of the new exception in the in-device system function of the first in-device system 108A of the first CE device 106A. The server 102 may be further configured to generate the first instruction further based on the AI service provided by the neural network model 104. The first instruction may be an instruction to restore the in-device system function of the first in-device system 108A. The server 102 may be further configured to generate the first instruction based on the learning of the neural network model 104. In one or more embodiments, the generated first instruction may be an output of the neural network model 104 for the determined cause of the trigger as input to the neural network model 104. Specifically, in some cases, the server 102 may be configured to utilize a plurality of different exceptions and corresponding historical resolution information of a plurality of different resolutions as training data to train the neural network model 104. The plurality of different exceptions may be a plurality of errors that may have occurred in the first CE device 106A previously. The plurality of different exceptions may be different from the detected new exception. The historical resolution information may be information of the solution of the plurality of different exceptions that are different from the detected new exception. The server 102 may be further configured to utilize the historical resolution information of the plurality of different exceptions to generate the first instruction for the resolution of the detected new exception. For example, the first instruction may be generated to reset certain settings of the first CE device 106A. The resolution of the detected new exception in the first CE device 106A is further described, for example, in FIGS. 3, 4, and 5.

The server 102 may be further configured to control the first in-device system 108A of the first CE device 106A in accordance with the generated first instruction, based on the AI service. The first in-device system 108A of the first CE AI device 106A may be controlled such that the in-device system function of the first in-device system 108A is restored. The server 102 may be further configured to resolve the detected new exception in the in-device system function of the first in-device system 108A based on the generated first instruction and restore the in-device system function of the first in-device system 108A of the first CE device 106A.

In accordance with an embodiment, the server 102 may be further configured to utilize the generated first instruction for the resolution of the detected new exception to resolve similar errors which may occur in the future. The server 102 may be further configured to store the determined cause of trigger of the new exception and the generated first instruction for the resolution of the new exception. For example, in future, if an exception or error similar to the detected new exception occurs in the first CE device 106A, the server 102 may be configured to utilize the stored first instruction for the new exception to resolve similar exceptions or errors.

In accordance with an embodiment, the server 102 may be further configured to utilize resolution information from different AI service-based servers to generate the first instruction for the resolution of the new exception in the first CE device 106A. The server 102 may be further configured to generate an exception resolution instruction to handle the new exception for other devices of the plurality of CE devices 106 subscribed to the AI service. The exception resolution instruction may be an instruction for the resolution of the detected new exception based on the AI service and may be used to resolve an exception similar to or same as the new exception in other CE devices of the plurality of CE devices 106. The server 102 may be further configured to resolve the exception similar to or same as the new exception in other CE device (such as the second CE device 106B) based on the exception resolution instruction.

Figure 2:
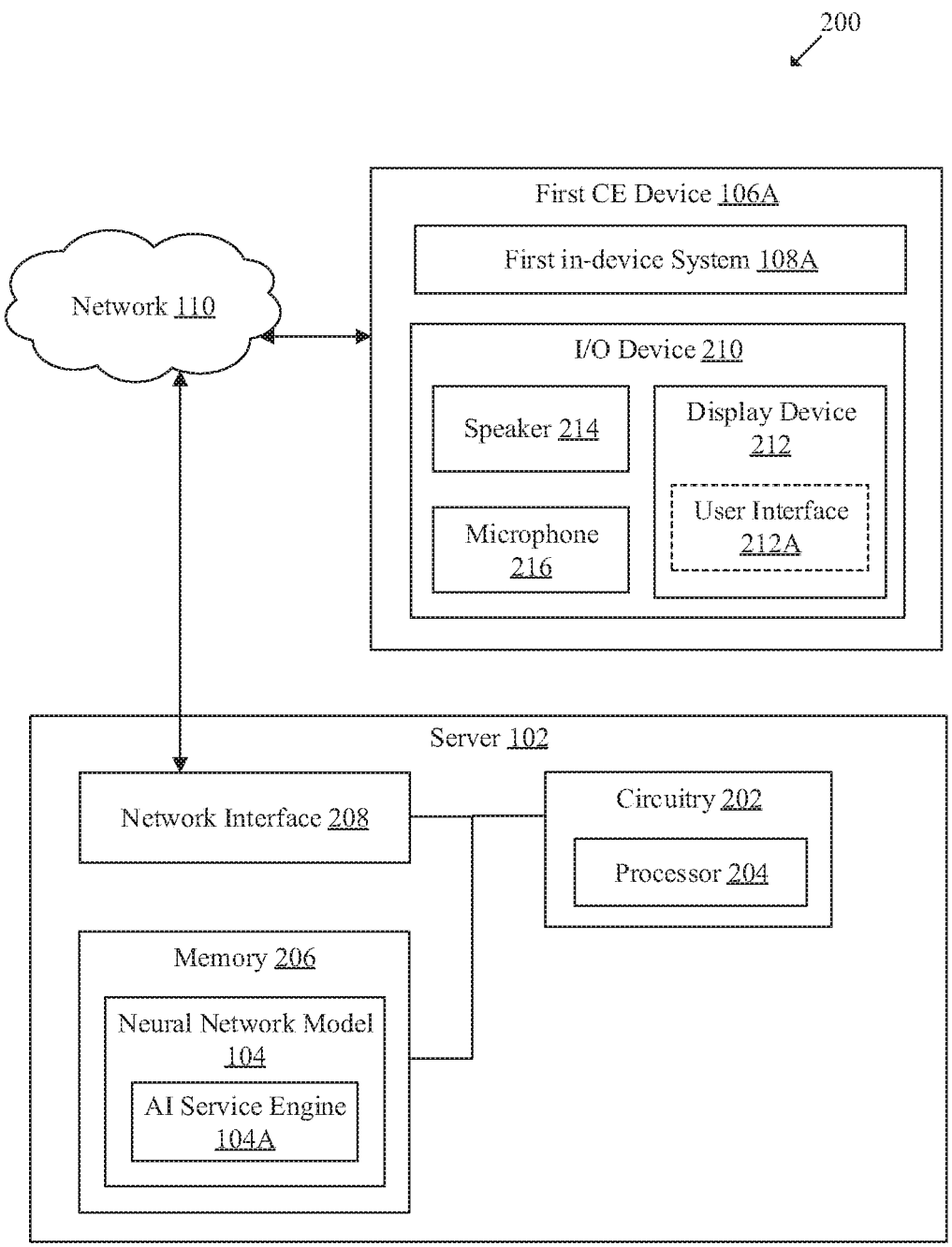
FIG. 2 is a block diagram that illustrates an exemplary server for AI service-based handling of exceptions in consumer electronic devices, in accordance with an embodiment of the disclosure.

FIG. 2 is a block diagram that illustrates an exemplary server for AI service-based handling of exceptions in consumer electronic devices, in accordance with an embodiment of the disclosure. FIG. 2 is explained in conjunction with elements from FIG. 1. With reference to FIG. 2, there is shown a block diagram 200 of the server 102 that may be coupled to the first CE device 106A. The server 102 may further include circuitry 202 which may include one or more processors, such as a processor 204. The server 102 may further include a memory 206 which may be configured to store the neural network model 104 and the AI service engine 104A. The server 102 may further include a network interface 208. There is further shown a block diagram of the first CE device 106A which includes an input/output (I/O) device 210.

The circuitry 202 may comprise suitable logic, circuitry, and interfaces that may be configured to detect a new exception in an in-device system function of the first in-device system 108A of the first CE device 106A of the plurality of CE devices 106, based on the AI service. The circuitry 202 may be further configured to determine the cause of trigger of the new exception in the in-device system function, based on the AI service and the plurality of different parameters of the first CE device 106A. The circuitry 202 may be further configured to generate the instruction to configure the in-device system of the first CE device 106A, based on the AI service and the determined cause of trigger of the new exception. The circuitry 202 may be further configured to resolve the detected new exception in the in-device system function and restore the in-device system function of the first CE device 106A, based on the AI service.

The processor 204 may comprise suitable logic, circuitry, and interfaces that may be configured to execute instructions stored in the memory 206. In certain scenarios, the processor 204 may be configured to execute the aforementioned operations of the circuitry 202. The processor 204 may be implemented based on a number of processor technologies known in the art. Examples of the processor 204 may be a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), other processors, or a combination thereof.

The memory 206 may comprise suitable logic, circuitry, and interfaces that may be configured to store the neural network model 104. The memory 206 may be further configured to store the plurality of different parameters of the first CE device 106A. Examples of implementation of the memory 206 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 208 may comprise suitable logic, circuitry, and interfaces that may be configured to facilitate communication between the server 102 and the first CE device 106A, via the network 110. The network interface 208 may be implemented by use of various known technologies to support wired or wireless communication of the server 102 with the network 110. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The I/O device 210 may comprise suitable logic, circuitry, and interfaces that may be configured to receive an input and provide an output based on the received input. The I/O device 210 may include various input and output devices, which may be configured to communicate with the circuitry 202. Examples of the I/O device 210 may include, but are not limited to, a touch screen, a keyboard, a mouse, a joystick, a display device (for example, the display device 212), a microphone (for example, a microphone 216), and a speaker (for example, the speaker 214). The display device 212 may comprise suitable logic, circuitry, and interfaces that may be configured to display an output of the first CE device 106A. The display device 212 may be utilized to render a user interface 212A. In some embodiments, the display device 212 may be an external display device associated with the first CE device 106A. The display device 212 may be a touch screen which may enable a user to provide a user-input via the display device 212. The touch screen may be at least one of a resistive touch screen, a capacitive touch screen, or a thermal touch screen. The display device 212 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 212 may refer to a display screen of a head mounted device (HMD), a smart-glass device, a see-through display, a projection-based display, an electro-chromic display, or a transparent display. The operations of the circuitry 202 are described in detail, for example in FIGS. 3, 4, 5, and 6.

Figure 3:
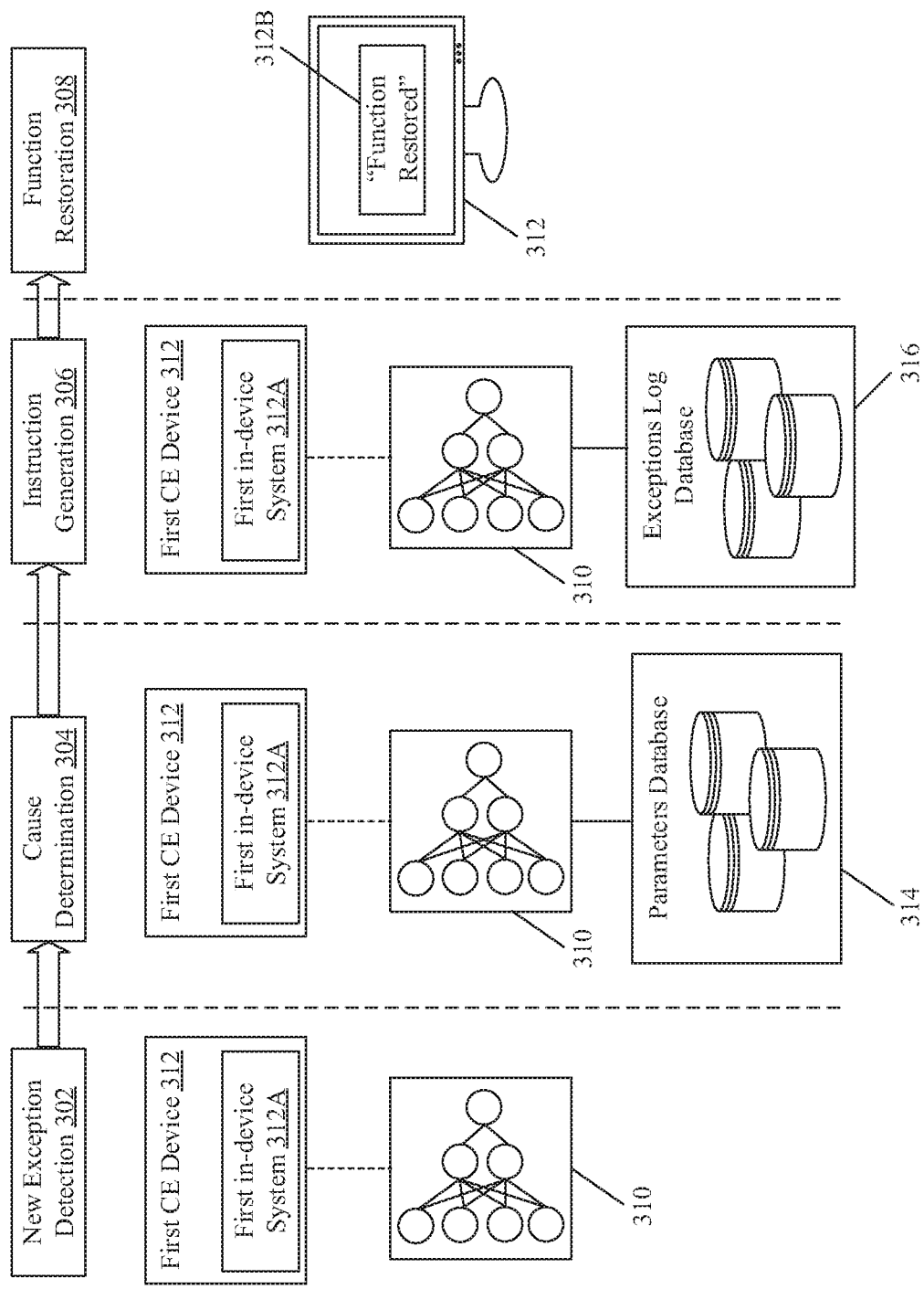
FIG. 3 is a diagram that illustrates exemplary operations for AI service-based handling of exceptions in a CE device, in accordance with an embodiment of the disclosure.

FIG. 3 is a diagram that illustrates exemplary operations for AI service-based handling of exceptions in a CE device, in accordance with an embodiment of the disclosure. FIG. 3 is described in conjunction with elements from FIG. 1 and FIG. 2. With reference to FIG. 3, there is shown a processing pipeline that includes a set of operations for AI service-based handling of exceptions in a CE device. The set of operations for AI service-based handling of exceptions in a CE device may be performed by the server 102.

At 302, a new exception detection operation is executed. In the new exception detection operation, the circuitry 202 may be configured to detect a new exception in an in-device system function of a first in-device system 312A of a first CE device 312. The new exception may be detected based on the AI service that may be provided by a neural network 310. The neural network 310 may correspond to the neural network model 104 of FIG. 1. The first CE device 312 may correspond the first CE device 106A of FIG. 1 and similarly, the first in-device system 312A may correspond to the first in-device system 108A of FIG. 1. The new exception may be a new error or a malfunction in the in-device system function of the first in-device system 312A of the first CE device 312.

For example, the new exception may be an error that may occur while connecting a new speaker to a smart television. A configuration of the new speaker may be completely different from all the speakers that may be present in a market. As a result, the audio output may not be received properly from the new speaker connected to the smart television. Furthermore, the error that may occur while connecting the new speaker to the smart television may be a new error which may not be known previously. Since, the error may not be previously known, it may be difficult and time consuming for a customer service center to provide a solution for the error encounter in the smart television.

The circuitry 202 may be configured to detect the new exception or a new error in the in-device system function of the first in-device system 312A of the first CE device 312 based on an abnormal change or discrepancy in the operation of the in-device system function. The circuitry 202 may be configured to detect if there is any error in an ongoing operation of the in-device system function of the first in-device system 312A. As an example, the first in-device system 312A may be an installed application on the first CE device 312. In such cases, the circuitry 202 may be configured to detect if there is any error in any function executed by the installed application of the first CE device 312. As another example, the first in-device system 312A may be a hardware component of the first CE device 312. In such cases, the circuitry 202 may be configured to detect if there is an error in an operation of any hardware system of the first CE device 312. As another example, the circuitry 202 may be configured to detect an error associated with a display panel of the first CE device 312 (e.g., television, mobile phone, personal computer, etc.), an internal speaker of the first CE device 312, or any other hardware system of the first CE device 312. As another example, the detected new exception in the in-device system function of the first in-device system 312A (such as an installed application), may correspond to unresponsiveness of the installed application due to hanging or freezing of that installed application on the first in-device system 312A. The circuitry 202 may be further configured to detect the new exception based on the AI service provided by the neural network 310. The detected new exception may have occurred for the first time in the in-device system function of the first in-device system 312A.

At 304, a cause determination operation may be executed. In the cause determination operation, the circuitry 202 may be configured to determine a cause of trigger of the new exception in the in-device system function of the first in-device system 312A of the first CE device 312. The circuitry 202 may be further configured to determine the cause of trigger of the new exception based on the AI service provided by the neural network 310. The circuitry 202 may be further configured to determine the cause of trigger of the new exception based on a plurality of different parameters that may be stored in a parameters database 314. The parameters database 314 may include the plurality of different parameters of the first CE device 312. The plurality of different parameters may include, but is not limited to, hardware information, a difference in current device settings with respect to factory settings, a version and configuration of the in-device system, an error log, or application data of one or more installed applications. The parameters database 314 may further include, but is not limited to, a plurality of application services and processes running at the time of occurrence of the new exception, a power state, historical data of a plurality of exceptions, a network connection state, or an activity record at the first CE device 312 for a specified time-period elapsed from the time of the occurrence of the new exception.

The circuitry 202 may be configured to evaluate the first CE device 312 with respect to the plurality of different parameters of the parameters database 314, based on the AI service provided by the neural network 310. As an example, when the detected new exception is for the new speaker connected to a smart television (i.e. the first CE device 312), the circuitry 202 may be configured to evaluate the hardware information of the first CE device 312 and a version and configuration of the first in-device system 312A. The circuitry 202 may be further configured to evaluate whether the configuration of the new speaker is compatible to be connected to the first CE device 312 based on the evaluated hardware information and the version and configuration of the first in-device system 312A. As another example, the circuitry 202 may be configured to evaluate a physical connection parameter of the first CE device 312 to determine whether a physical connection between the new speaker and the first CE device 312 is correct or incorrect.

The circuitry 202 may be further configured to determine the cause of trigger of the new exception based on the evaluation of the plurality different parameters. The circuitry 202 may be configured to evaluate a minimum of two parameters from the plurality of different parameters stored in the parameters database 314. The circuitry 202 may be further configured to correlate the detected new exception with the plurality of different parameters of the first CE device 312 based on the AI service. In certain cases, the circuitry 202 may be configured to establish a correlation between the detected new exception and the plurality of different parameters of the first CE device 312 that may have caused the new exception based on the AI service. For example, if the cause of trigger of the error in connection of the new speaker with the first CE device 312 is based on the hardware information of the first CE device 312 and the version and configuration of the first in-device system 312A, then the circuitry 202 may be configured to correlate errors in connection of the new speaker with the plurality of different parameters. The circuitry 202 may be further configured to utilize the correlation between the new exception and the plurality of different parameters to train the neural network 310. The correlation between the new exception and the plurality of different parameters may be further utilized by the circuitry 202 to determine the cause of trigger of an error or malfunction similar to the detected new exception in future.

The circuitry 202 may be further configured to categorize the detected new exception into a specific exception case group of a plurality of exception case groups based on the AI service. Each of the plurality of exception case groups may correspond to a type of exception or error in the first CE device 312. For example, the exception case group may be, a hardware exception group, a software exception group, a connectivity exception group, a configuration exception group, and the like. The circuitry 202 may be further configured to categorize the detected new exception into the specific exception case group of the plurality of exception case groups based on the type of exception detected in the first CE device 312. An exception in each exception case group of the plurality of exception groups may be based on a set of parameters of the plurality of different parameters. The categorization of the new exception into the specific exception case group may be further utilized to detect any similar exception or error in the first CE device 312 in future.

The circuitry 202 may be further configured to determine whether to select or ignore a parameter of the plurality of different parameters of the first CE device 312 at the time of establishment of correlation of the detected new exception with the plurality of different parameters. The circuitry 202 may be further configured to determine whether to select or ignore the parameter based on the specific exception case group in which the detected new exception is categorized. The circuitry 202 may be further configured to evaluate only the selected parameter of the plurality of different parameters while detecting the cause of trigger of the new exception based on the categorization of the detected new exception. For example, if an error similar to the detected new exception occurs and is detected in future, then the circuitry 202 may be configured to only evaluate the set of parameters that correspond to the specific exception case group associated with the detected new exception. As a result, the detection of the error and the determination of the cause of trigger of the error (similar to the detected new exception) may be faster in future.

At 306, an instruction generation operation may be executed. In the instruction generation operation, the circuitry 202 may be configured to generate a first instruction to configure the first in-device system 312A specific to the new exception based on the determined cause of trigger of the new exception in the in-device system function of the first in-device system 312A. The first instruction may be generated based on the AI service provided by the neural network 310. The first instruction may be a solution (e.g., an exception handling routine) for the detected new exception in the in-device system function of the first in-device system 312A. Additionally or alternatively, the first instruction may be generated further based on the learning of the neural network 310. The circuitry 202 may be further configured generate the first instruction to modify the plurality of different parameters corresponding to the cause of trigger of the new exception in the first CE device 312. For example, the first instruction may be generated to configure the first in-device system 312A (such as a speaker) of the first CE device 312. In another example, the first instruction may be further generated to disconnect the first in-device system 312A (such as the speaker) and reconnect the first in-device system 312A in a correct port of the first CE device 312. The first instruction may be generated to modify the plurality of different parameters that may be the cause of trigger of the new exception. The circuitry 202 may be further configured to utilize the generated first instruction to restore the in-device system function of the first in-device system 312A. Alternatively stated, the first instruction may be utilized to handle the detected new exception.

The circuitry 202 may be further configured to establish an associative relationship among the detected new exception, the first in-device system 312A in which the new exception is detected, the cause of trigger of the new exception, the generated first instruction, the specific exception case group in which the detected new exception is categorized, and a result of the restoring of the first in-device system 312A.

The circuitry 202 may be further configured to store the associative relationship in an exceptions log database 316. The exceptions log database 316 may include a log of all the exceptions in the in-device system function of the first in-device system 312A. The circuitry 202 may be further configured to utilize the exceptions log database 316 to detect exceptions or errors in the first CE device 312 and restore the in-device system function of the first in-device system 312A of the first CE device 312. The exceptions log database 316 may reduce time required by the circuitry 202 to detect the exception or error in the first CE device 312 and resolve the exception or error in the first CE device 312 at future instances. The circuitry 202 may be further configured to train the neural network 310 based on the established associative relationship. Additionally, the circuitry 202 may be configured to learn and update the AI service based on the established associative relationship. The neural network 310 may be trained and updated each time a new exception is detected. The circuitry 202 may be further configured to utilize the trained neural network 310 to detect and resolve new exceptions in the in-device system function of the first CE device 312 in future.

At 308, a function restoration operation may be executed. In the function restoration operation, the circuitry 202 may be configured to control the in-device system of the first CE device 312 in accordance with the generated first instruction based on the AI service such that the in-device system function of the first in-device system 312A is restored. The circuitry 202 may be further configured to handle the detected new exception based on the generated first instruction. The circuitry 202 may be further configured to automatically control the in-device system function of the first in-device system 312A, in accordance with the generated first instruction. As an example, the circuitry 202 may be configured to automatically configure the first in-device system 312A in accordance with the generated first instruction to resolve the detected new exception. As another example, the circuitry 202 may be configured to automatically restart the first CE device 312 in accordance with the generated first instruction to resolve the detected new exception.

In one or more embodiments, the circuitry 202 may be further configured to output a notification 312B for the restoration of the in-device system function on the first CE device 312. As an example, the notification 312B may be a popup message that says "Function Restored" on the display device 212 of the first CE device 312. As another example, the notification 312B may be an audio message output via a speaker, such as the speaker 214 of the first CE device 312.

In some embodiments, the circuitry 202 may be configured to output a notification in accordance with the generated first instruction. The notification may be output as assistive/guidance information to be followed by a user to resolve the error associated with the detected new exception. As an example, if the detected new exception is related to an incorrect physical connection of the first in-device system 312A of the first CE device 312, a notification may be provided so as to assist the user to follow certain to reconnect the first in-device system 312A to the first CE device 312. As another example, if the detected new exception is related to a malfunction in the first in-device system 312A, a notification may be provided so as to assist the user to follow certain steps to replace the first in-device system 312A.

Figure 4:
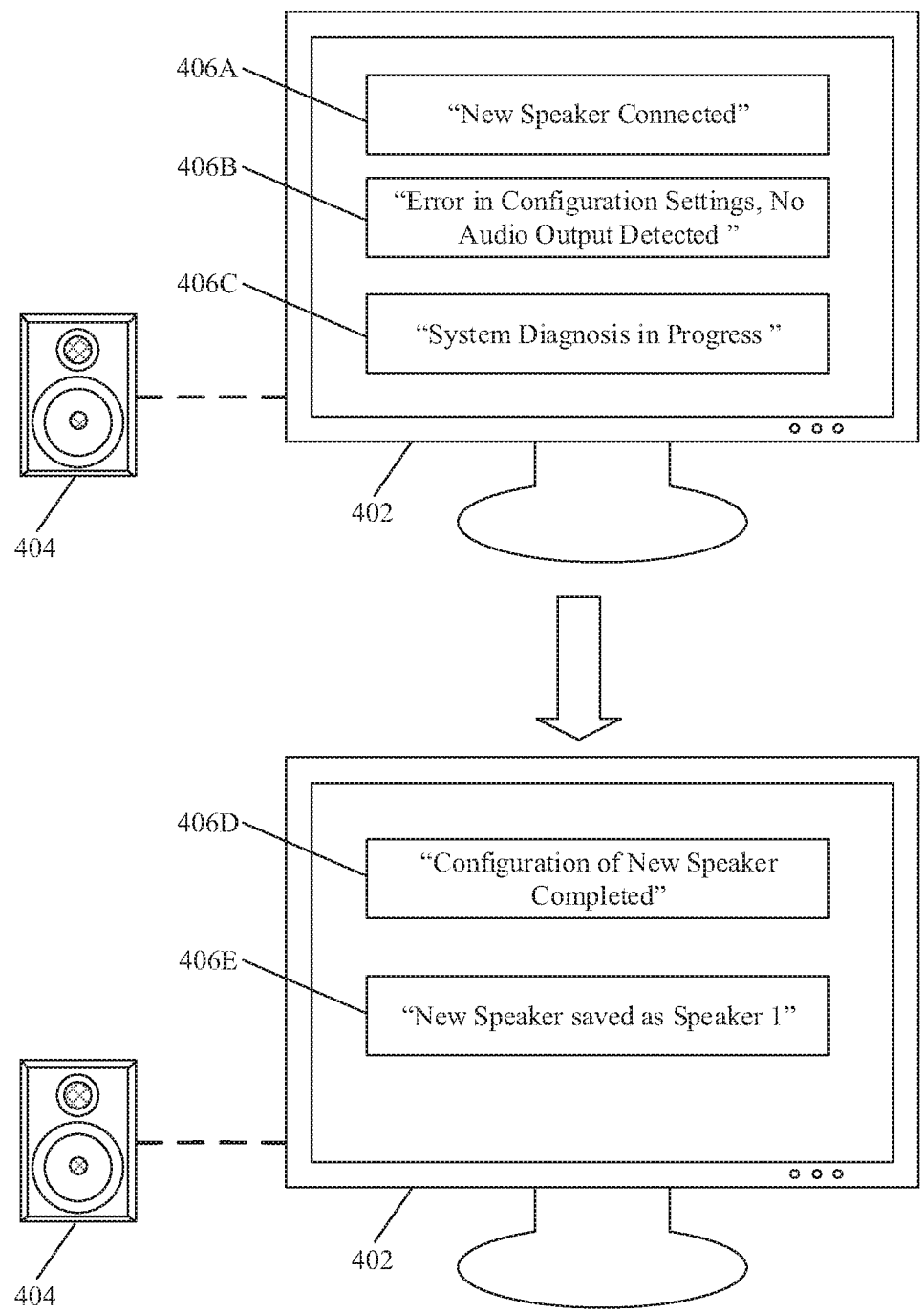
FIG. 4 is a diagram that illustrates a scenario for AI-based handling of exceptions in a CE device, in accordance with an embodiment of the disclosure.

FIG. 4 is a diagram that illustrates an exemplary scenario for AI-based handling of exceptions in a CE device, in accordance with an embodiment of the disclosure. FIG. 4 is explained in conjunction with elements from FIGS. 1, 2, and 3. With reference to FIG. 4, there is shown a television 402 and a speaker 404 connected to the television 402. Herein, the television 402 and the speaker 404 may be merely considered as examples of the first CE device 312 and the first in-device system 312A, respectively. The television 402 may be subscribed to the AI service provided by neural network model 104 of the server 102. The circuitry 202 may be configured to detect a connection of the speaker 404 to the television 402 and display a first notification 406A on the television 402 based on the detection of connection of the speaker 404 to the television 402. Shown as an example, the first notification 406A may be displayed as a message ("New Speaker Detected") on the television 402.

In certain exemplary scenarios, the speaker 404 may be supported by a specific configuration, for example, a hardware configuration, a networking configuration, a software configuration, or a combination thereof. The television 402 may either lack the specific configuration or may have an old incompatible configuration settings (which may require an update) and thereby may cause the television 402 to have an incompatibility issue with the speaker 404. As a result, there may be no audio output from the speaker 404 connected to the television 402. The circuitry 202 may be configured to detect an error in system configuration between the speaker 404 and the television 402. The detected error may correspond a new exception. The circuitry 202 may be further configured to display a second notification 406B on the television 402 for the detected error in the system configuration. Shown as an example, the second notification 406B may be displayed as "Error in Configuration Settings. No Audio Output Detected" on the television 402.

The circuitry 202 may be further configured to determine a cause of the trigger of the detected error based on the AI service provided by the neural network model 104. As an example, the cause of trigger of the error may be due to errors in configuration settings on one of the speaker 404 or the television. The circuitry 202 may be further configured to display a third notification 406C on the television 402 based on determination of the cause of trigger of the error. Shown as an example, the third notification 406C may be displayed as "System Diagnosis in Progress" on the television 402.

The circuitry 202 may be further configured to generate the first instruction based on the AI service provided by the neural network model 104. Further, the circuitry 202 may be configured to configure the speaker 404 and/or the television 402 and to automatically resolve the detected error based on the generated first instruction. For example, the detected error may be resolved by updating configuration settings of the speaker 404 and/or the television 402. The circuitry 202 may be further configured to display a fourth notification 406D on the television 402 after configuration of the speaker 404. Shown as an example, the fourth notification 406D may be display as "Configuration of New Speaker Completed" on the television 402.

The circuitry 202 may be further configured to save the updated configuration settings of the speaker 404. Also, in certain embodiments, the circuitry 202 may be configured to add the speaker 404 in a list of saved devices for the television 402. Thereafter, the circuitry 202 may be configured to display a fifth notification 406E on the television 402 to indicate that the updated configuration settings of the speaker 404 is saved. Shown as an example, the fifth notification 406E may be displayed as "New Speaker saved as Speaker 1" on the television 402.

In some embodiments, the circuitry 202 may be configured to receive a user input about an error in connection of the speaker 404 with the television 402, via the television 402. For example, the user input may be a natural language voice input in which the user specifies an issue associated with no audio output from the speaker 404. In such cases, the circuitry 202 may be configured to receive the input from the user and configure the speaker 404 in accordance with the first instruction based on the AI service provided by the neural network model 104. After the configuration, the detected error may be resolved and the function of the speaker 404 may be restored. The configured speaker 404 may operate in accordance with an intended use of the speaker 404 for the television 402.

Figure 5:
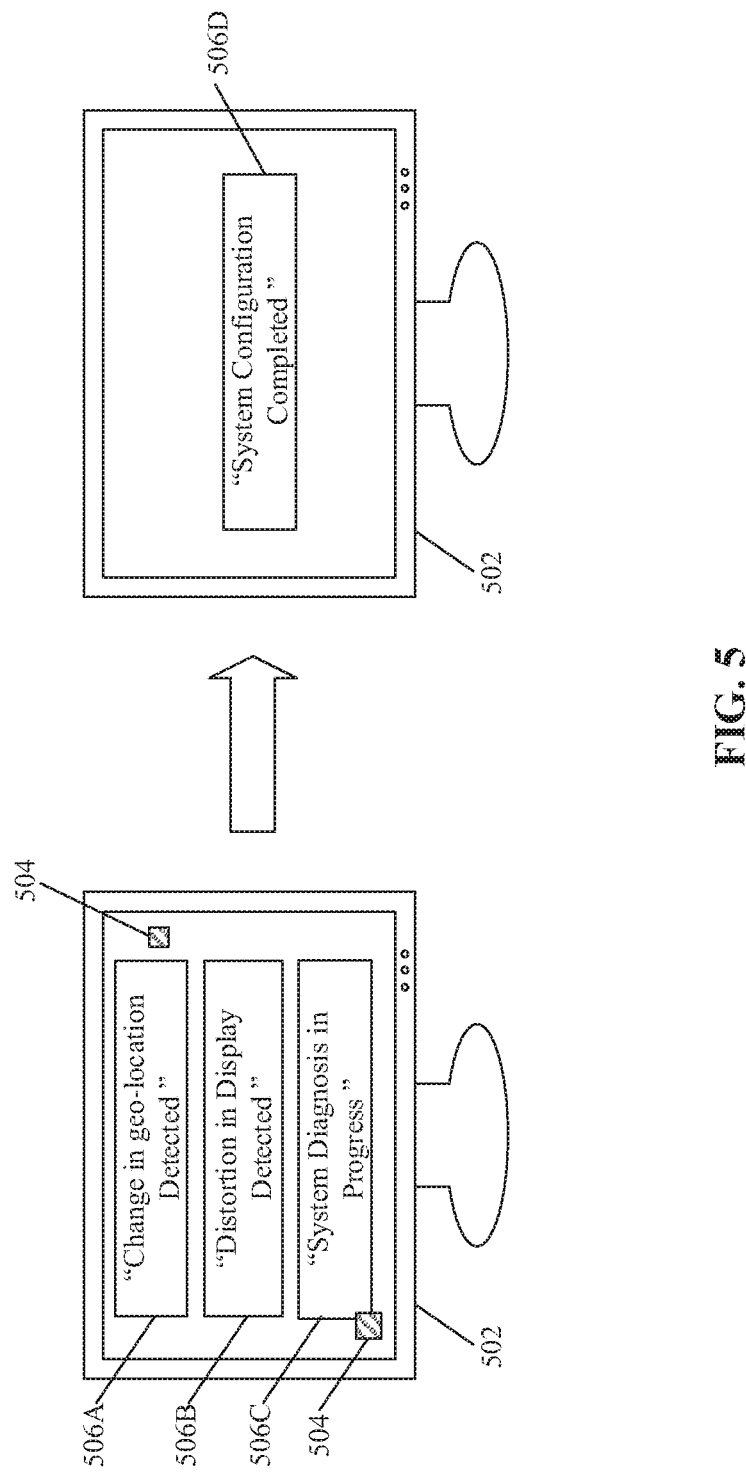
FIG. 5 is a diagram that illustrates a scenario for AI-based handling of exceptions in a CE device, in accordance with an embodiment of the disclosure.

FIG. 5 is a diagram that illustrates an exemplary scenario for AI-based handling of exceptions in a CE device, in accordance with an embodiment of the disclosure. FIG. 5 is explained in conjunction with elements disclosed in FIGS. 1, 2, 3 and 4. With reference to FIG. 5, there is shown a television 502. Herein, the television 502 may be merely construed as an example of the first CE device 312. The television 502 may be subscribed to the AI service provided by neural network model 104 of the server 102. In certain scenarios, geo-location of the television 502 may change from a first geo-location to a second geo-location.

In some embodiments, the television 502 may include a location sensor that may be configured to sense the geo-location of the television 502 and communication the geo-location to the server 102. The circuitry 202 may be configured to detect a change in the geo-location of the television 502 and accordingly display a first notification 506A on the television 502 for the detected change in the geo-location of the television 502. Shown as an example, the first notification 506A may be displayed as "Change in geo-location detected" on the television 502.

The circuitry 202 may be further configured to detect a distortion 504 in a display of the television 502. In certain embodiments, the circuitry 202 may be configured to receive a user input, for example, a natural language voice input, to indicate the presence of the distortion 504 in the display of the television 502. The detected distortion 504 may correspond to the new exception. The circuitry 202 may be configured to display a second notification 506B on the television 502 for the detected distortion 504 in the display of the television 502. Shown as an example, the second notification 506B may be displayed as "Distortion in Display Detected" on the television 502.

The circuitry 202 may be further configured to determine a cause of trigger of the detected distortion 504 based on the AI service provided by the neural network model 104. For example, the distortion 504 may be caused by the change in the geo-location of the television 502 and specifically due to a ghost effect caused by multipath distortion of television signals as the geo-location changes. The circuitry 202 may be further configured to display a third notification 506C on the television 502 for determination of the cause of trigger of the distortion 504. Shown as an example, the third notification 506C may be displayed as "System Diagnosis in Progress" on the television 502.

The circuitry 202 may be further configured to generate the first instruction to configure the television 502 based on the AI service provided by the neural network model 104. Specifically, the television 502 may be configured to use a ghost canceller to nullify the ghost effect.

The circuitry 202 may be further configured to configure the television 502 in accordance with the first instruction to remove the detected distortion 504 and thereby resolve the new exception. The circuitry 202 may be further configured to display a fourth notification 506D on the television 502 for configuration of the television 502. Shown as an example, the fourth notification 506D may be displayed as "System Configuration Completed" on the television 502.

Figure 6:
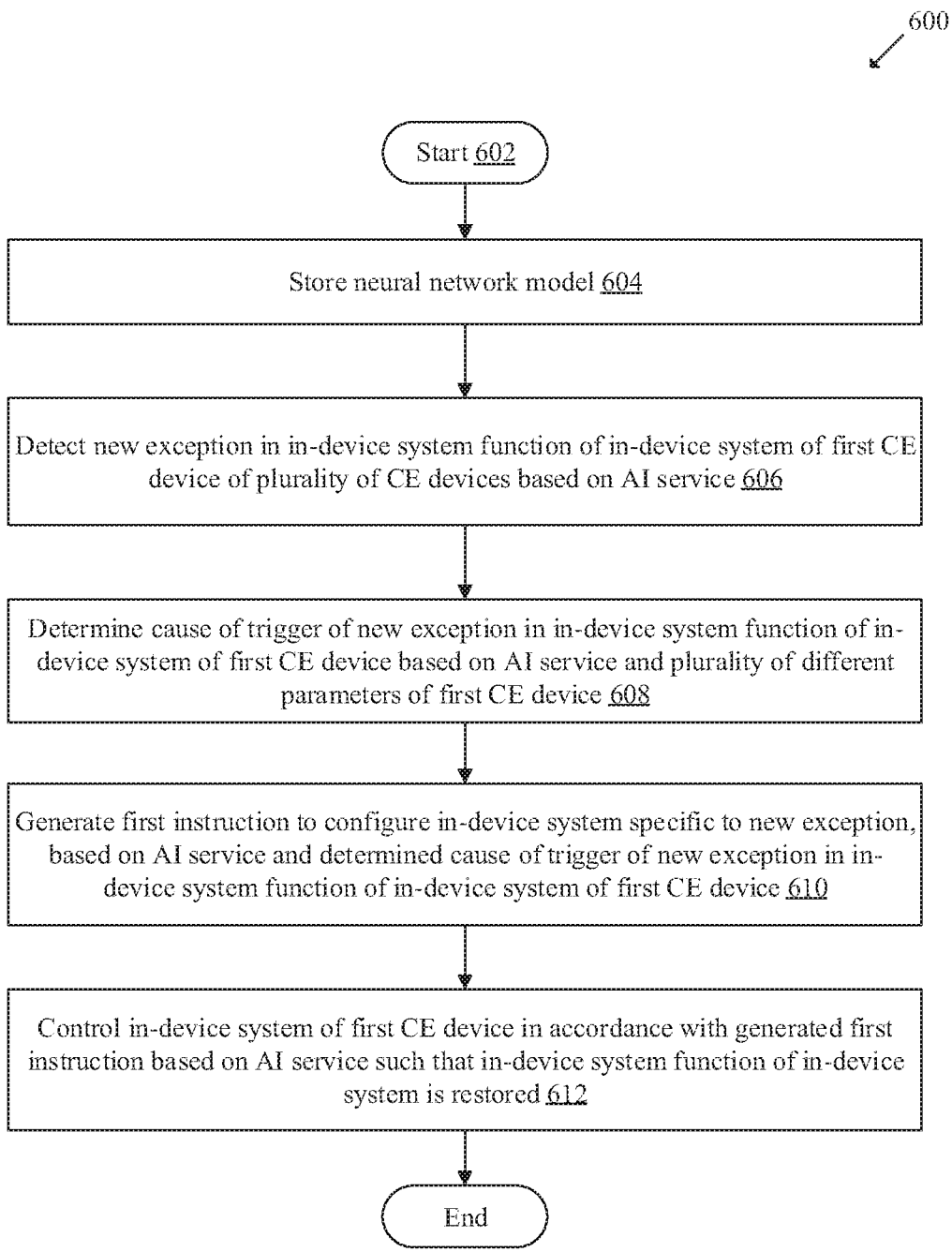
FIG. 6 is a flowchart that illustrates an exemplary method for AI service-based handling of exceptions in CE devices, in accordance with an embodiment of the disclosure.

FIG. 6 is a flowchart that illustrates an exemplary operations for AI service-based handling of exceptions in CE devices, in accordance with an embodiment of the disclosure. FIG. 6 is described in conjunction with elements from FIGS. 1, 2, 3, 4, and 5. With reference to FIG. 6, there is shown a flowchart 600. The operations of the flowchart 600 may be executed a computing system, such as the server 102. The operations may start at 602 and proceed to 604.

At 604, the neural network model 104 may be stored. In one or more embodiments, the server 102 may be configured to store the neural network model 104. The neural network model 104 may provide the AI service to handle exceptions in the plurality of CE devices 106 that may be subscribed to the AI service of the neural network model 104. The neural network model 104 may include the AI service engine 104A which may be configured to provide the AI service to handle exceptions in the plurality of CE devices 106. The neural network model 104 may be a trained model that may provide the AI service to resolve exceptions in the plurality of CE devices 106.

At 606, a new exception may be detected in the in-device system function of the first in-device system 108A of the first CE device 106A of the plurality of CE devices 106 based on the AI service. In one or more embodiments, the circuitry 202 may be configured to detect the new exception in the in-device system function of the first in-device system 108A of the first CE device 106A. The new exception may be an unhandled exception, a new exceptional error, or a malfunction in the in-device system function of the first in-device system 108A of the first CE device 106A.

At 608, a cause of trigger of the new exception in the in-device system function of the first in-device system 108A of the first CE device 106A may be determined based on the AI service and the plurality of different parameters of the first CE device 106A. In one or more embodiments, the circuitry 202 may be configured to determine the cause of trigger of the detected new exception. Examples of the plurality of different parameters of the first CE device 106A are provided in FIG. 1. The determination of the cause of trigger of the detected new exception is described, for example, in FIG. 3.

At 610, a first instruction may be generated to configure the first in-device system 108A specific to the new exception based on the AI service and the determined cause of trigger of the new exception in the in-device system function of the in-device system of the first CE device 106A. In one or more embodiments, the circuitry 202 may be configured to generate the first instruction to configure the first in-device system 108A of the first CE device 106A specific to the new exception. The first instruction may be an instruction to restore the in-device system function of the first in-device system 108A. The circuitry 202 may be further configured to generate the first instruction based on the learning of the neural network model 104. The generation of the first instruction is described, for example, in FIG. 3.

At 612, the first in-device system 108A of the first CE device 106A may be controlled in accordance with the generated first instruction, based on the AI service such that the in-device system function of the in-device system is restored. In one or more embodiments, the circuitry 202 may be configured to control the first CE device 106A in accordance with the generated first instruction, based on the AI service. The circuitry 202 may be further configured to resolve the detected new exception in the in-device system function of the first in-device system 108A based on the generated first instruction. The restoration of the first in-device system 108A of the first CE device 106A is described, for example, in FIG. 3. The control may pass to end.

Various embodiments of the disclosure may provide a non-transitory, computer-readable medium and/or storage medium, and/or a non-transitory machine readable medium and/or storage medium stored thereon, instructions executable by a machine and/or a computer, such as a server, for AI service-based handling of exceptions in CE devices. The at least one code section may cause the machine and/or computer to perform operations that include storage of a neural network model that provides an AI service to handle exceptions in a plurality of CE devices that are subscribed to the AI service of the neural network model. The operations further include detection of a new exception in an in-device system function of an in-device system of a first CE device of the plurality of CE devices. The operations further include determination of a cause of trigger of the new exception in the in-device system function of the in-device system of the first CE device, based on the AI service and a plurality of different parameters of the first CE device. The operations further include generation of a first instruction to configure the in-device system specific to the new exception, based on the AI service and the determined cause of trigger of the new exception in the in-device system function of the in-device system of the first CE device. The operations further include controlling of the in-device system of the first CE device in accordance with the generated first instruction based on the AI service such that the in-device system function of the in-device system is restored.

Exemplary aspects of the disclosure may include the server 102 configured to store the neural network model 104 that provides an AI service to handle exceptions in the plurality of CE devices 106 that are subscribed to the AI service of the neural network model 104. The server 102 may include the circuitry 202. The circuitry 202 may be configured to detect, based on the AI service, a new exception in an in-device system function of the first in-device system 108A of the first CE device 106A of the plurality of CE devices 106. The circuitry 202 may be further configured to determine a cause of trigger of the new exception in the in-device system function of the first in-device system 108A of the first CE device 106A, based on the AI service. The circuitry 202 may be further configured to determine the cause of trigger of the new exception further based on a plurality of different parameters of the first CE device 106A. The circuitry 202 may be further configured to generate, based on the AI service, a first instruction to configure the first in-device system 108A specific to the new exception. The circuitry 202 may be further configured to generate the first instruction further based on the determined cause of trigger of the new exception in the in-device system function of the first in-device system 108A of the first CE device 106A. The circuitry 202 may be further configured to control the first in-device system 108A of the first CE device 106A in accordance with the generated first instruction based on the AI service such that the in-device system function of the first in-device system 108A is restored.

The first in-device system 108A may be at least one of a hardware system, a device set-up configuration system, an installed application, or a firmware in the first CE device 106A. The plurality of different parameters of the first CE device 106A may include hardware information, a difference in current device settings with respect to factory settings, a version and configuration of the in-device system, an error log, application data of one or more installed applications or a plurality of application services and processes running at the time of occurrence of the new exception. The plurality of different parameters of the first CE device 106A may further include a power state, historical data of a plurality of exceptions, a network connection state, or an activity record at the first CE device for a specified time period elapsed from the time of the occurrence of the new exception.

The circuitry 202 may be further configured to utilize a plurality of different exceptions and corresponding historical resolution information of a plurality of different resolutions as training data to train the neural network model 104. The circuitry 202 may be further configured to correlate the detected new exception with the plurality of different parameters of the first CE device 106A based on the AI service. The circuitry 202 may be further configured to categorize the detected new exception into a specific exception case group of a plurality of exception case groups based on the AI service. The circuitry 202 may be further configured to determine whether to select or ignore a parameter of the plurality of different parameters of the first CE device 106A at the time of establishment of correlation of the detected new exception with the plurality of different parameters of the first CE device 106A. The determination of whether to select or ignore a parameter of the plurality of different parameters of the first CE device 106A may be based on the specific exception case group in which the detected new exception is categorized.

The circuitry 202 may be further configured to establish an associative relationship among the detected new exception, the first in-device system 108A in which the new exception is detected, the cause of trigger of the new exception, the generated first instruction, the specific exception case group in which the detected new exception is categorized, and a result of the restoring of the first in-device system 108A. The circuitry 202 may be further configured to learn and update the AI service based on the established associative relationship. In accordance with an embodiment, the circuitry 202 may be further configured to generate, based on the neural network model 104, an exception resolution instruction to handle the new exception for other devices of the plurality of CE devices 106 subscribed to the AI service.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims

What is claimed is:

1. A server, comprising:
   a memory configured to store a neural network model that provides an artificial intelligence (AI) service to handle exceptions in a plurality of consumer electronic (CE) devices that are subscribed to the AI service of the neural network model; and
   circuitry configured to:
   detect, based on the AI service, a new exception in an in-device system function of an in-device system of a first CE device of the plurality of CE devices, wherein the in-device system includes a hardware system or firmware;
   determine a cause of trigger of the detected new exception in the in-device system function based on the AI service and a plurality of different parameters of the first CE device, wherein the plurality of different parameters include hardware information of the first CE device and a difference in current device settings of the first CE device with respect to factory settings of the first CE device;
   generate a first instruction to configure the in-device system specific to the detected new exception, wherein the generation of the first instruction is based on the AI service and the determined cause of the trigger of the detected new exception;
   control the in-device system of the first CE device to reconfigure the hardware system or the firmware in accordance with the generated first instruction based on the AI service such that the in-device system function of the in-device system is restored;
   categorize the detected new exception into a specific exception case group of a plurality of exception case groups based on the AI service;
   establish an associative relationship among the detected new exception, the in-device system in which the new exception is detected, the cause of the trigger of the detected new exception, the generated first instruction, the specific exception case group in which the detected new exception is categorized, and a result of the restoring of the in-device system function; and
   learn and update the AI service based on the established associative relationship.

2. The server according to claim 1, wherein the in-device system is at least one of a hardware system, a device set-up configuration system, an installed application, or a firmware in the first CE device.

3. The server according to claim 1, wherein the plurality of different parameters of the first CE device further include a version and configuration of the in-device system, an error log, application data of one or more installed applications, a plurality of application services and processes running at a time of occurrence of the detected new exception, a power state, historical data of a plurality of exceptions, a network connection state, or an activity record at the first CE device for a specified time period elapsed from the time of the occurrence of the detected new exception.

4. The server according to claim 1, wherein the circuitry is further configured to utilize a plurality of different exceptions and corresponding historical resolution information of a plurality of different resolutions as training data to train the neural network model.

5. The server according to claim 1, wherein the circuitry is further configured to correlate the detected new exception with the plurality of different parameters of the first CE device based on the AI service.

6. The server according to claim 5, wherein the circuitry is further configured to determine whether to select or ignore a parameter of the plurality of different parameters of the first CE device at a time of establishment of the correlation of the detected new exception with the plurality of different parameters of the first CE device, based on the specific exception case group in which the detected new exception is categorized.

7. The server according to claim 1, wherein the circuitry is further configured to generate, based on the neural network model, an exception resolution instruction to handle the new exception for a second CE device of the plurality of CE devices subscribed to the AI service.

8. A method, comprising:
   in a server that comprises a memory and circuitry:
   storing, by the memory, a neural network model that is configured to provide an artificial intelligence (AI) service to handle exceptions in a plurality of consumer electronic (CE) devices that are subscribed to the AI service of the neural network model;
   detecting, by the circuitry, a new exception in an in-device system function of an in-device system of a first CE device of the plurality of CE devices based on the AI service, whereiin the in-device system includes a hardware system or firmware;
   determining, by the circuitry, a cause of trigger of the detected new exception in the in-device system function based on the AI service and a plurality of different parameters of the first CE device, wherein the plurality of different parameters include hardware information of the first CE device and a difference in current device settings of the first CE device with respect to factory settings of the first CE device;

generating, by the circuitry, a first instruction to configure the in-device system specific to the detected new exception, wherein the generation of the first instruction is based on the AI service and the determined cause of the trigger of the detected new exception;

controlling, by the circuitry, the in-device system of the first CE device to reconfigure the hardware system or the firmware in accordance with the generated first instruction based on the AI service such that the in-device system function of the in-device system is restored;

categorizing, by the circuitry, the detected new exception into a specific exception case group of a plurality of exception case groups based on the AI service;

establishing, by the circuitry, an associative relationship among the detected new exception, the in-device system in which the new exception is detected, the cause of the trigger of the detected new exception, the generated first instruction, the specific exception case group in which the detected new exception is categorized, and a result of the restoring of the in-device system function; and learning and updating, by the circuitry, the AI service based on the established associative relationship.

9. The server according to claim 1, wherein the determined cause of the trigger includes one of an error or an undesirable change in the plurality of different parameters of the first CE device.

10. The method according to claim 8, wherein the plurality of different parameters of the first CE device further include a version and configuration of the in-device system, an error log, application data of one or more installed applications, a plurality of application services and processes running at a time of occurrence of the detected new exception, a power state, historical data of a plurality of exceptions, a network connection state, or an activity record at the first CE device for a specified time period elapsed from the time of the occurrence of the detected new exception.

11. The method according to claim 8, further comprising utilizing, by the circuitry, a plurality of different exceptions and corresponding historical resolution information of a plurality of different resolutions as training data to train the neural network model.

12. The method according to claim 8, further comprising correlating, by the circuitry, the detected new exception with the plurality of different parameters of the first CE device based on the AI service.

13. The method according to claim 12, further comprising determining, by the circuitry, whether to select or ignore a parameter of the plurality of different parameters of the first CE device at a time of establishment of the correlation of the detected new exception with the plurality of different parameters of the first CE device, based on the specific exception case group in which the detected new exception is categorized.

14. The method according to claim 8, further comprising generating, by the circuitry, an exception resolution instruction based on the neural network model to handle the new exception for a second CE device of the plurality of CE devices subscribed to the AI service.

* * * * *